(12) United States Patent
Schraer

(10) Patent No.: US 8,376,677 B2
(45) Date of Patent: Feb. 19, 2013

(54) THREADED INSERT AND VEHICLE COMPONENT

(75) Inventor: Thorsten Schraer, Jetzendorf (DE)

(73) Assignee: Acument GmbH & Co. oHG (DE)

( * ) Notice: Subject to any disclaimer, the term of this patent is extended or adjusted under 35 U.S.C. 154(b) by 341 days.

(21) Appl. No.: 12/812,580

(22) PCT Filed: Jan. 20, 2009

(86) PCT No.: PCT/DE2009/000058
§ 371 (c)(1),
(2), (4) Date: Jul. 12, 2010

(87) PCT Pub. No.: WO2009/092355
PCT Pub. Date: Jul. 30, 2009

(65) Prior Publication Data
US 2010/0290865 A1   Nov. 18, 2010

(30) Foreign Application Priority Data
Jan. 24, 2008   (DE) .................. 20 2008 000 982 U

(51) Int. Cl.
*F16B 37/12*   (2006.01)
(52) U.S. Cl. ........................ 411/178; 411/110
(58) Field of Classification Search .............. 411/110; 285/143.1
See application file for complete search history.

(56) References Cited

U.S. PATENT DOCUMENTS

| | | | | |
|---|---|---|---|---|
| 1,570,520 | A * | 1/1926 | Oehrli | 285/143.1 |
| 2,444,145 | A * | 6/1948 | Rosan | 411/178 |
| 3,370,631 | A | 2/1968 | James | |
| 4,776,737 | A * | 10/1988 | Wollar | 411/38 |
| 4,820,235 | A | 4/1989 | Weber et al. | |
| 5,435,678 | A * | 7/1995 | Stencel | 411/178 |
| 7,585,237 | B2 * | 9/2009 | Fukuda | 474/80 |
| 2010/0066073 | A1 * | 3/2010 | Jensen et al. | 285/3 |

FOREIGN PATENT DOCUMENTS

| | | |
|---|---|---|
| DE | 39 32 193 C2 | 7/1992 |
| DE | 96 16 227.4 U1 | 5/1993 |
| DE | 10 2004 050 625 | 4/2006 |
| EP | 0 426 895 | 5/1991 |
| GB | 2 002 866 | 2/1979 |
| GB | 2 237 615 | 5/1991 |

OTHER PUBLICATIONS

English Translation of the International Search Report and International Preliminary Report on Patentability which issued in connection with corresponding PCT Application No. PCT/DE2009/000058.
Search Report of the German Patent and Trademark Office which issued in connection with corresponding German Patent Application No. 20 2008 000 982.2.

* cited by examiner

*Primary Examiner* — Gary Estremsky
(74) *Attorney, Agent, or Firm* — Clark Hill PLC

(57) ABSTRACT

The invention relates to a threaded insert (10) having a central coaxial bore (12) having an internal thread (14) in a rotationally symmetrical body, one end thereof having an external force engagement (16), and having a central externally protruding flange (18), wherein the end of the rotationally symmetrical body opposite the force engagement (16) on the other side of the flange (18) has an external thread (20) comprising a thread pitch opposite that of the internal thread (14) and the flange (18) has radially extending ribs (26) on the side thereof facing the external thread (20).

27 Claims, 4 Drawing Sheets

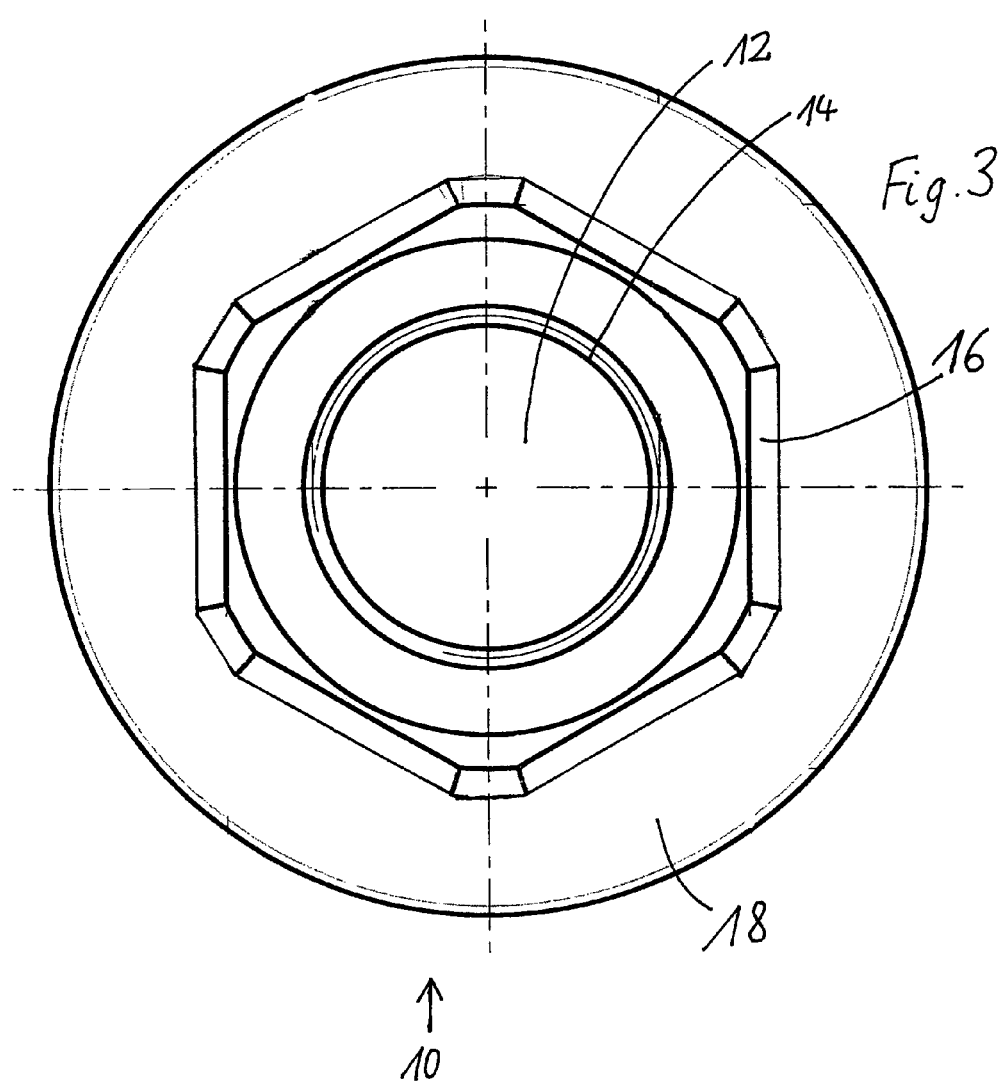

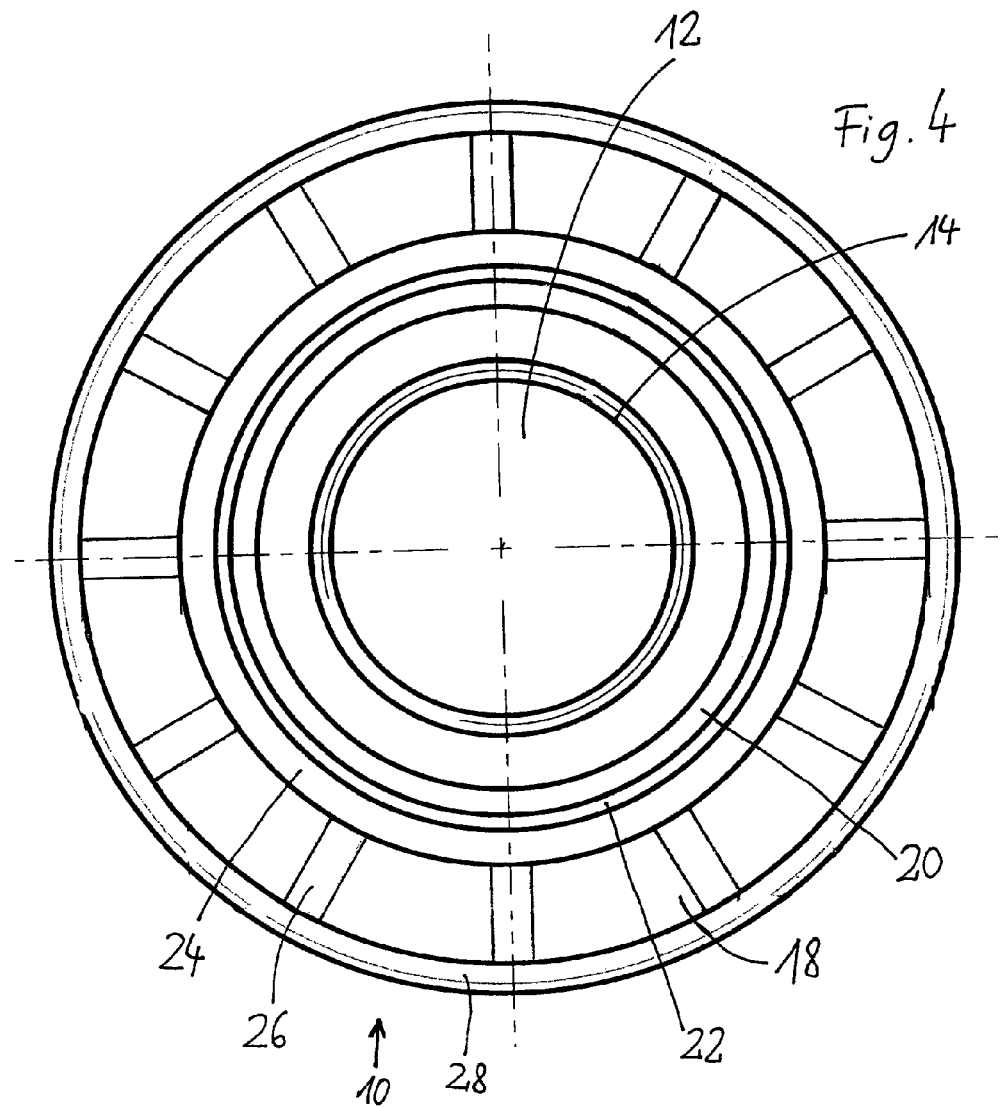

THREADED INSERT AND VEHICLE COMPONENT

RELATED/PRIORITY APPLICATION

Figure 1:
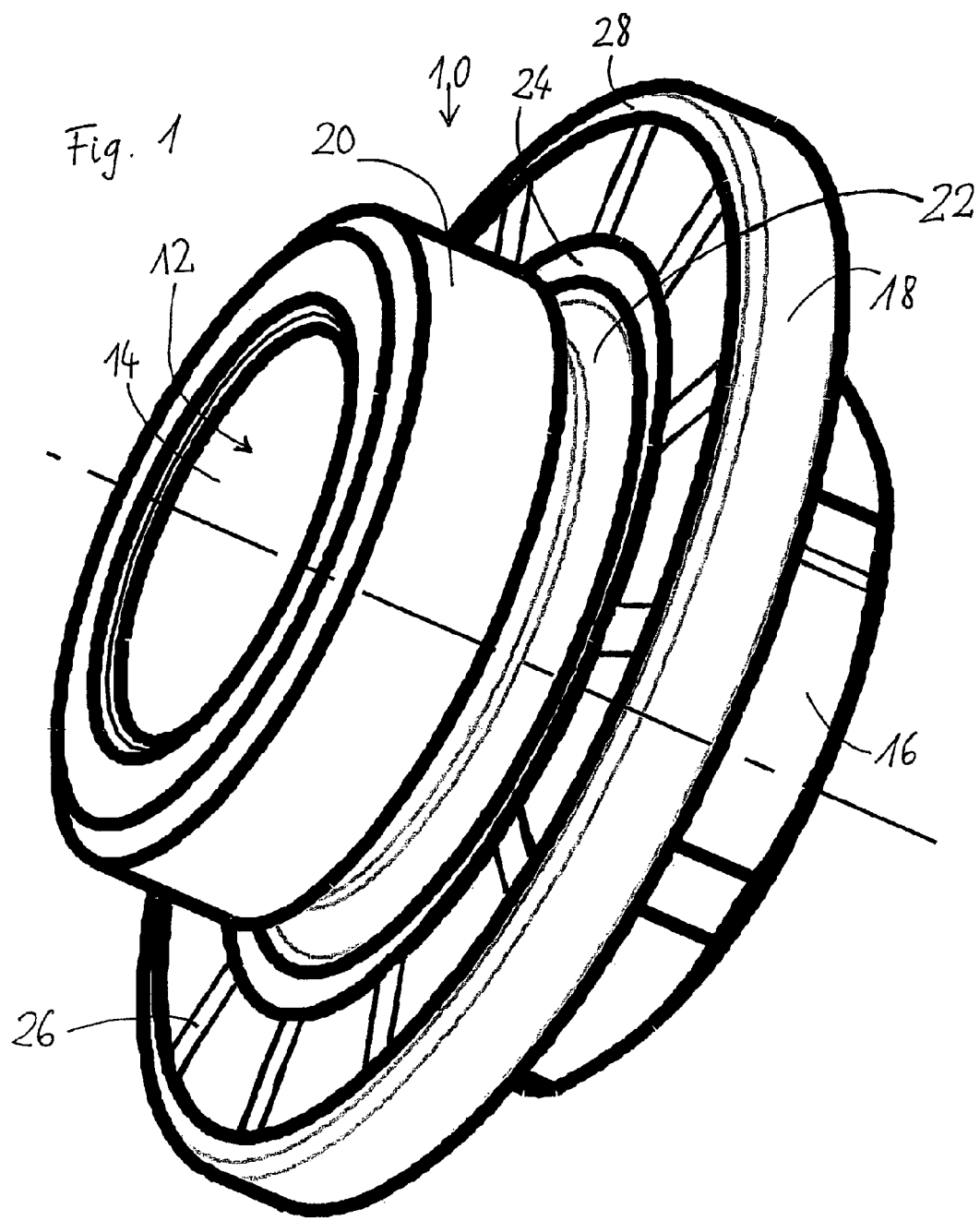

This application is a National Phase filing regarding International Application No. PCT/DE2009/000058, filed on Jan. 20, 2009, which relies upon German Application No. 20 2008 000 982.0, filed on Jan. 24, 2008 for priority.

The present invention relates to a threaded insert as well as to a vehicle component of light metal containing such a threaded insert.

To save weight, motor vehicles increasingly are constructed from light metal. In such vehicle body structures of light metal, then however screws consisting of steel have to be screwed in. Due to the low power of resistance of light metal this is leading to the fact that the corresponding screws easily are ripped out if they merely are placed in threads which had been cut into the light metal.

To solve this problem, until now threaded inserts ("flange nuts'") of steel have been used having a rotationally symmetrical body with a central coaxial bore provided with an interior thread and having a flange. These threaded inserts then instead of cut threads were placed in corresponding bores in the light metal components. This however only was possible in such cases of use in which one during the screwing-in of the corresponding screws had access to the reverse side of the light metal component to hold the threaded insert there, while the screw was threaded in.

In cases, when the corresponding reverse side during the time of screwing-in of the screws was not accessible according to the prior art it exclusively was possible to fix corresponding nuts by the means of metal clips, for example of the kind of a cage nut within the bores. This however led to further problems. On the one hand, the corresponding clip is giving in, if the screw too strongly is pressed against the nut. The nut then is making way and the screw therefore is not perpendicularly screwed into the thread but instead in a oblique manner. In some cases the clip, too, is wrongly installed and the screw cannot find the threaded interior bore of the nut. Further, the clip before the mounting of the corresponding component has to be installed at the bore. In the meantime, the clip by other working procedures can be stripped off. Further, in many cases, it is necessary to use on both sides of the vehicle differently designed clips. By this fact, the danger is existing that left and right parts will be mixed up and further it is necessary to maintain a larger number of parts. Finally, the manufacture of a corresponding clip and the insertion thereof into a corresponding bore is extremely costly. Finally, the corresponding combination of nut and clip, in many cases, is leading to the fact that an excessive punctual force is exerted on one point of the light metal component. In these cases, the light metal shows the tendency to "flow" such that the connection over the time can become loose. This last problem by the way is becoming effective, too, in cases where a threaded insert according to the prior art is used with the flange not being chosen sufficiently large or where this is not possible.

It is therefore the task to be solved by the present invention to create a possibility by the means of which with a low expenditure and high reliability a possibility is created to provide for the screwing in of steel screws into light metal body components of a vehicle.

According to the invention, this task is solved by a threaded insert which additionally is having an external thread comprising a thread pitch opposite to that of the internal thread as well by a vehicle component of light metal having a thread insert of steel in which the thread insert at one end on the other side of the flange is provided with an external thread which is having a thread pitch opposite to that of the internal thread with the threaded insert by means of this external thread is screwed into a corresponding internal thread in the vehicle component.

By means of the threads with the opposite pitches against each other, in an advantageous way it is achieved that the threaded insert still more firmly is screwed into the vehicle component if the corresponding screw is tightened. Further, not any more the entire screwing force is transferred to the light metal component via the flange but instead a non-unsubstantial part of this screwing force is transferred into the light metal component by means of the exterior thread. In this way, the load peaks in the contact surface of the flange on the light metal component are avoided by the means of which otherwise a flowing of the light metal could occur. According to the present invention, therefore for example larger forces can be transferred or the corresponding flange can be chosen smaller compared with threaded inserts according to the prior art.

It is especially preferred in this connection that the interior thread is a right-hand thread and the external thread is a left-hand thread. In this way usual screws having a right-hand thread can be screwed in in the usual way.

The threaded insert preferably is consisting of steel since in this way the optimal match of materials to the corresponding screws is achieved.

It is especially preferred to provide the flange on the sides facing the external thread with radially extending ribs. In this way, an additional safety against loosening between the threaded insert and the light metal component is achieved.

Further, it is preferred to position an annularly circulating groove between the flange and the external thread. In this way, it is ensured that the side of the flange facing the external thread is carrying on the entire surface thereof and that the threaded insert not only is in contact in a small area in the transition zone between the external thread and the flange and therefore is transferring force only in this region. Without this circulating groove the bore into which the threaded insert is screwed in what have to be provided with the corresponding recess which however would mean an additional work expenditure.

In this connection, it is especially preferred if the groove in the way of an undercut is extending into the flange in an axial direction, too.

Preferably as an external force engagement an external hexagon is used.

It is especially preferred to provide the flange on its surface facing the external thread at the outer edge with an annularly circulating projection projecting in an axial direction to achieve in this way a sealing of the external thread against corrosive influences.

Additionally it is preferred to provide the flange on its surface facing the external thread on the internal side with an annularly circulating projection projecting in an axial direction and surrounding the external thread. This, too, is serving the further sealing of the external thread against humidity and salt from the exterior to prevent in this way an eventual electro-chemic corrosion between the external thread and the light material of the vehicle component.

Figure 2:
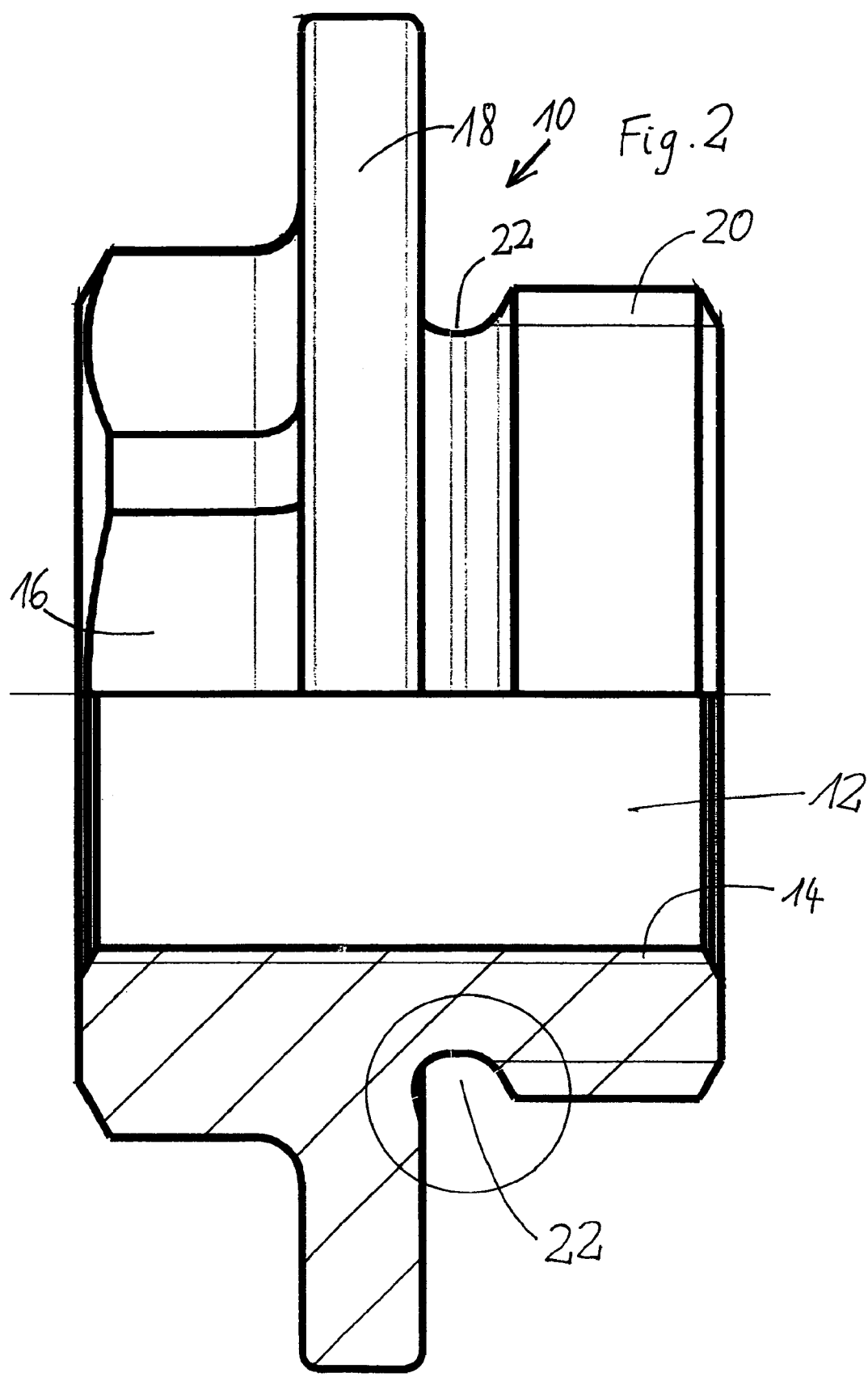

An exemplary embodiment of the present invention, in the following, is more detailedly disclosed with reference to the attached drawings. In the drawings show:

FIG. 1 a three-dimensional representation of a threaded insert according to the invention;

FIG. 2 a representation of the threaded insert of FIG. 1 from the side partly in section in a plane running through the rotational axis of the threaded insert;

FIG. 3 a representation of the threaded insert according to FIG. 1 seeing from the side of the force engagement; and FIG. 4 a view of the threaded insert according to FIG. 1 in a direction from the vehicle member.

FIG. 1 is showing a threaded insert 10 according to the invention with a rotationally symmetrical body in a three-dimensional view slantly shown from the side. Preferably this threaded insert is consisting of steel. It is having a central coaxial bore with an internal thread 14. The internal thread 14 in this connection is performed as a normal right-hand thread. On its exterior lateral area the threaded insert 10 at one end thereof is having an external force engagement 16. The same preferably is designed as an external hexagon. In the centre of the threaded insert 10 the force engagement 16 is followed by a far outwardly projecting flange 18 being annular, too. Beyond this flange 18, at the other end of the threaded insert 10 an external thread 20 is provided which here is designed as a left-hand thread. In this connection it is of advantage that the pitch of the internal thread 14 and the external thread 20 are directed against each other. Self-evidently, too, the internal thread 14 can be a left-hand thread and the external thread 20 can be a right-hand thread.

Between the external thread 20 and the flange 18 an annular circulating groove 22 is positioned. As most clearly can be seen from the cross-sectional view of FIG. 2, this annular circulating groove 22 is extending, too, slightly in axial direction into the flange 18.

On the surface of the flange 18 facing the external thread 20 and therefore later facing the surface of the vehicle component, the groove 22 is followed by a circulating ring 24 projecting from the surface of the flange 18. The same during the tightening of the thread 20 in a vehicle member should be pressed against the surface of the vehicle component and therefore should create a sealing of the thread 20. Externally beyond this annular projection 24 then on the surface of the flange 18 facing the vehicle component there are radially extending rib-like projections 22 which, too, are projecting in the direction of the surface of the vehicle component and which in their tangential cross-section are designed flatly curved. These rib-like projections 26 are serving the safety against loosening to avoid that in operation the external thread 20 is loosened with respect to the vehicle component into which it had been screwed in. The effect of these ribs 26 is corresponding the ribs in connection with the rib washer known from the prior art (see EP 426 895 B1).

In connection with the present embodiment, twelve such ribs 26 are provided. Self-evidently, the number of these ribs depending from the size of the threaded insert and depending from the combination of materials can be chosen differently. Preferably the ribs 26 are equally distributed over the circumference.

Beyond the area containing the ribs 26 on the surface of the flange 18 facing the vehicle member there is a further annularly circulating projection 28 which in the mounted state of the threaded insert 10 is serving as a further seal for the thread 20 and the rib-like projections 26 with respect to capillary intruding fluids.

The above embodiment according to the invention has the following advantages:

The opposite pitch of the threads 14 and 20 is ensuring that during the screwing in of a screw into the internal thread 14 the threaded insert still more firmly is screwed into the vehicle component. In this way in an advantageous way, the tension force which is transferred by means of the internal thread 14 is distributed onto the surface of the flange 18 facing the external thread and to the external thread 20. Therefore the surface pressure is decreased and followingly either a smaller diameter for the flange 18 or a higher torque for screwing in the screw can be chosen.

The circulating annular groove 22 saves the expenditure to recess the thread in the vehicle component at the edge thereof with respect to the external thread 20. Nevertheless it is ensured that the flange 18 is contacting with the entire surface thereof and not as this would be the case without recessing the thread in the vehicle component and without the groove 22 merely in a small annular area around the external thread 20.

It is true that the present invention has been developed for the material combination vehicle component of light metal (for example aluminium or aluminum alloys) and threaded insert of steel. Such threaded inserts however in an advantageous way can be used in other components consisting of soft materials, for example plastics or GFK. Then the threaded insert 10 can be produced from a different material, for example from a correspondingly harder plastic or from a softer metal.

The invention claimed is:

1. Threaded insert having a central coaxial bore having an internal thread in an axially symmetrical body, one end thereof having an external key face and an opposite end thereof providing an external thread, said external thread having a thread pitch which is opposite that of the internal thread, a central externally protruding flange having radially extending ribs on a side thereof facing the external thread, wherein the key face is provided as being an external hexagon.

2. Threaded insert according to claim 1, wherein the internal thread is a right-hand thread and the external thread is a left-hand thread.

3. Threaded insert according to claim 1, wherein the threaded insert comprises steel.

4. Threaded insert according to claim 1, further comprising an annularly circulating groove between the flange and the external thread.

5. Threaded insert according to claim 4, characterized in that the groove has the form of an undercut also extending in an axial direction into the flange.

6. Threaded insert having a central coaxial bore having an internal thread in an axially symmetrical body, one end thereof having an external key face and an opposite end thereof providing an external thread, said external thread having a thread pitch which is opposite that of the internal thread, a central externally protruding flange, having radially extending ribs on a side thereof facing the external thread, wherein the flange on a surface facing the external thread at an outer edge thereof is provided with a projection projecting in the axial direction and being annularly circulating.

7. Threaded insert according to claim 6, wherein the internal thread is a right-hand thread and the external thread is a left-hand thread.

8. Threaded insert according to claim 6, wherein the threaded insert comprises steel.

9. Threaded insert according to claim 6, further comprising an annularly circulating groove between the flange and the external thread.

10. Threaded insert according to claim 9, characterized in that the groove has the form of an undercut also extending in an axial direction into the flange.

11. Threaded insert having a central coaxial bore having an internal thread in an axially symmetrical body, one end thereof having an external key face and an opposite end thereof providing an external thread, said external thread having a thread pitch which is opposite that of the internal thread, a central externally protruding flange, having radially extending ribs on a side thereof facing the external thread, wherein the flange on a surface facing the external thread on an inner side around the external thread is provided with a projection being annularly circulating and projecting in the axial direction.

12. Threaded insert according to claim 11, wherein the internal thread is a right-hand thread and the external thread is a left-hand thread.

13. Threaded insert according to claim 11, wherein the threaded insert comprises steel.

14. Threaded insert according to claim 11, further comprising an annularly circulating groove between the flange and the external thread.

15. Threaded insert according to claim 14, characterized in that the groove has the form of an undercut also extending in an axial direction into the flange.

16. Vehicle component of light alloy with a threaded insert having an axially symmetrical body provided with a central coaxial bore having an internal thread which by means of a flange is contacting the surface of a vehicle component, wherein the threaded insert at one end beyond the flange is provided with an external thread which has a thread pitch opposite to that of the internal thread and by the means of which the threaded insert is screwed into a corresponding internal thread in the vehicle component and, that the flange of the threaded insert has radially extending ribs on its surface facing the vehicle component, and wherein the threaded insert is provided with an external key face, which is an external hexagon.

17. Vehicle component according to claim 16, wherein the internal thread of the threaded insert is a right-hand thread and that the external thread is a left-hand thread.

18. Vehicle component according to claim 16, wherein a circulating annular groove is provided on the threaded insert between the flange and the external thread.

19. Vehicle component according to claim 18, wherein the groove in the form of an undercut is also extending in an axial direction into the flange.

20. Vehicle component of light alloy with a threaded insert having an axially symmetrical body provided with a central coaxial bore having an internal thread which by means of a flange is contacting the surface of a vehicle component, wherein the threaded insert at one end beyond the flange is provided with an external thread which has a thread pitch opposite to that of the internal thread and by the means of which the threaded insert is screwed into a corresponding internal thread in the vehicle component and, that the flange of the threaded insert radially extending ribs on its surface facing the vehicle component, and wherein the flange of the threaded insert on its side facig the external thread at the exterior edge is provided with a circulating annular projection projecting in the axial direction.

21. Vehicle component according to claim 20, wherein the internal thread of the threaded insert is a right-hand thread and that the external thread is a left-hand thread.

22. Vehicle component according to claim 20, wherein a circulating annular groove is provided on the threaded insert between the flange and the external thread.

23. Vehicle component according to claim 22, wherein the groove in the form of an undercut is also extending in an axial direction into the flange.

24. Vehicle component of light alloy with a threaded insert having an axially symmetrical body provided with a central coaxial bore having an internal thread which by means of a flange is contacting the surface of a vehicle component, wherein the threaded insert at one end beyond the flange is provided with an external thread which has a thread pitch opposite to that of the internal thread and by the means of which the threaded insert is screwed into a corresponding internal thread in the vehicle component and, that the flange of the threaded insert has radially extending ribs on its surface facing the vehicle component, and wherein the flange of the threaded insert on its side facing the external thread is provided with an annularly circulating projection projecting in the axial direction and surrounding the external thread.

25. Vehicle component according to claim 24, wherein the internal thread of the threaded insert is a right-hand thread and that the external thread is a left-hand thread.

26. Vehicle component according to claim 24, wherein a circulating annular groove is provided on the threaded insert between the flange and the external thread.

27. Vehicle component according to claim 26, wherein the groove in the form of an undercut is also extending in an axial direction into the flange.

* * * * *